Jan. 30, 1945. H. ST. PIERRE 2,368,271
CHAIN LINK
Filed July 6, 1942 2 Sheets-Sheet 1
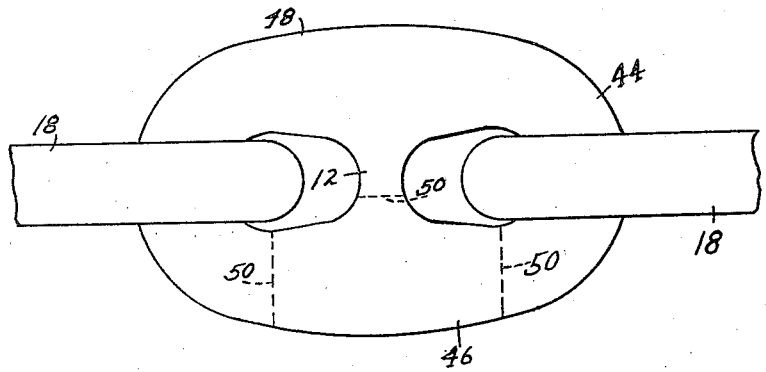
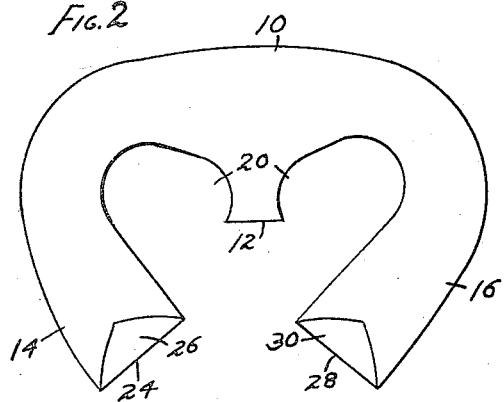
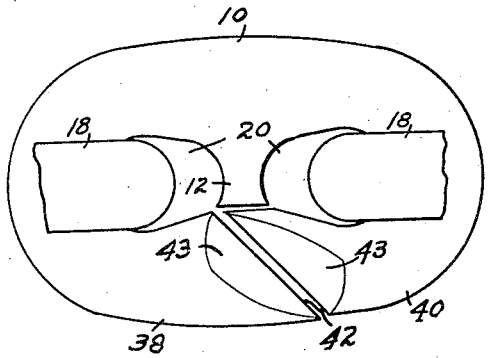
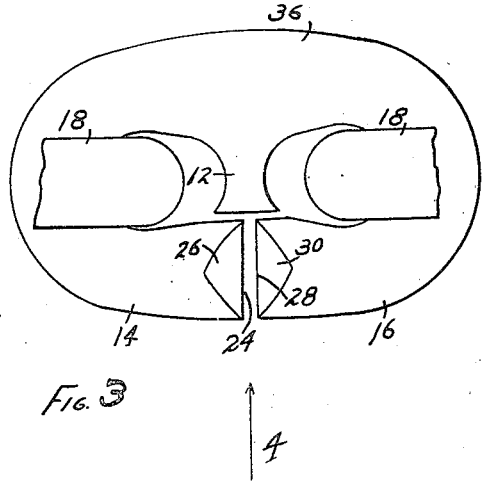
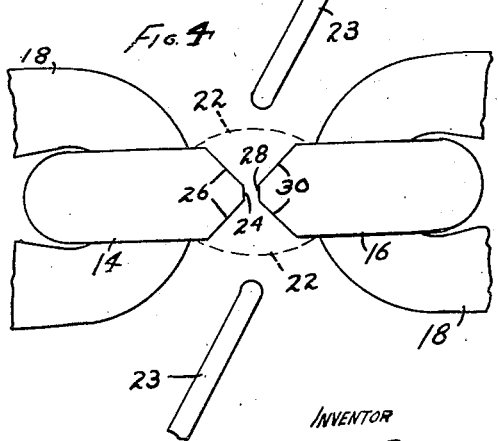
INVENTOR
HENRY ST. PIERRE
By Attorney
Charles R. Fay

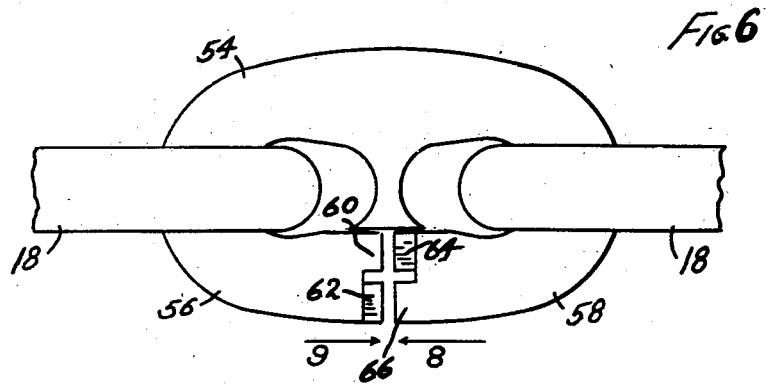
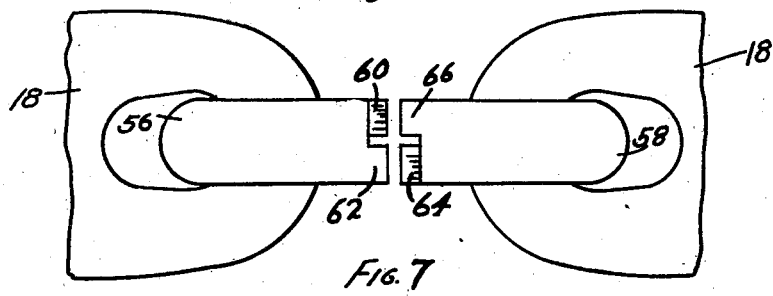
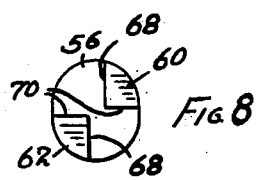
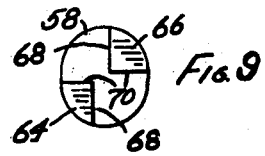
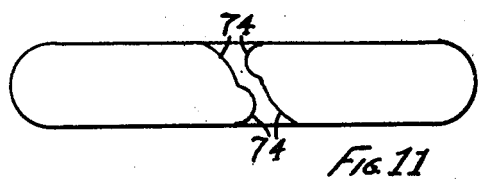
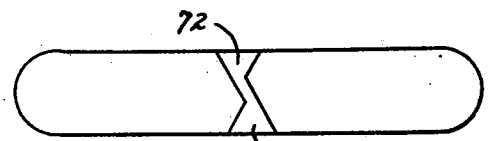

Patented Jan. 30, 1945

2,368,271

UNITED STATES PATENT OFFICE 2,368,271

CHAIN LINK

Henry St. Pierre, Worcester, Mass.

Application July 6, 1942, Serial No. 449,931

10 Claims. (Cl. 59—35)

This invention relates to chain links and methods of making the same, and the principal objects of the invention include the provision of a forged chain link formed initially as a blank having opposed spaced end elements forming an open side run, so that closed or solid links may be inserted over the elements and placed in the open link for the substantially continuous manufacture of forged chains, the open link then being closed and welded at the junction of the link end elements which now abut or nearly abut, with the addition of a surplus of welding metal at the weld; the link then being placed in a die and forged in a hammer at the weld under conditions of heat, the surplus metal thereby being evenly distributed over the side of the link having the end elements, this resulting in a completely forged solid link having a pair of forged solid links linked therewith, and also in a refinement of the welding metal and of the chain material forming the weld, by reason of the hammer blows used to forge the link; and the provision of chain links which are welded with the addition of surplus metal at the weld to close the links, plus a final forging action to finally complete the link, add a second welding operation, and give the link a smooth even contour, whereby an open link may be closed by welding and still obtain the benefits of forging.

Other objects and advantages of the invention will appear hereinafter.

Reference is to be had to the accompanying drawings in which

Fig. 1 shows a completed link made according to one form of the invention and illustrating the smooth even contour obtained;

Fig. 2 shows a forged blank according to the invention;

Fig. 3 illustrates the blank of Fig. 2 in closed condition, the two closed forged links being assembled therewith;

Fig. 4 is a view of the link of Fig. 3 looking in the direction of arrow 4 in Fig. 3;

Fig. 5 shows a closed blank according to a modification;

Fig. 6 is a plan view of a further modified blank;

Fig. 7 is an edge view of a link according to Fig. 6 with the arms brought together;

Figs. 8 and 9 are end views of the arms looking in the directions of arrows 8 and 9 respectively in Fig. 6; and Figs. 10 and 11 are edge views of further modified blanks.

In general, the chains and chain links herein disclosed conform to the type of chain appearing in my Patent No. 2,277,567 of March 24, 1942, and are used for similar purposes; and although only stud links have been illustrated in the present application, the invention applies equally well to plain links without the studs.

Referring first to Fig. 2, the blank here shown comprises an open-sided link having a solid run or side 10, a free-ended center stud 12 integral therewith, an end element or arm 14 curved reversely to lie in opposed and spaced relation to another similar but opposed arm 16. This blank is forged in a hammer and consequently is strong and durable whether made of iron or steel or alloy, or whether heat treated or not, and if heat treated, the weld is not disturbed thereby. The space between elements or arms 14 and 16 is for the purpose of receiving a pair of solid links 18, each of which will lie in a chain eye or opening 20. When the solid links 18 have been positioned, the arms 14, 16 are brought together by any means desired or convenient, and the ends of the arms are then welded together, a surplus of melted welding metal being applied to the ends of the arms as indicated at 22 in Fig. 4, as by rods 23. The chain of three links, or the continuous chain thereby formed, is then processed to forge the welds in a hammer to spread the welding metal and refine the same, so that smooth, solid forged links such as shown in Fig. 1 are obtained, and therefore every link in the chain will be forged and hence strong and tough.

In Figs. 2 and 3, the arm 14 is forged to a broad pointed edge conformation with the edge 24 located at the end of the arm, and formed as by bevels 26 at each side of the arm. Arm 16 is forged to a complementary shape, its pointed edge 28 being located at the end of this arm opposite to edge 24, and being formed as by the bevels 30. When the links 18 have been entered into their eyes, the arms 14 and 16 are forced inwardly and the edges 24, 28 approach just opposite each other in a closely spaced relation, see Figs. 3 and 4. The edges 24, 28 overlie the stud in closely spaced relation thereto.

Stud 12 need not be used, but in cases where it is present, the welding material 22 will overlie the end of the stud and weld it to the link arms, and the surplus of metal may be utilized to impart any desired shape to the stud, and to the arms by the final forging operation.

Fig. 5 illustrates a link 10 similar to the link of Figs. 2 and 3, but in this case the arms 38, 40 are dissimilar and are provided with oblique complementary and opposed edges 42 which form a weld line diagonally of the link. This weld is longer than the transverse weld of Fig. 4, and consequently more welding metal is used, but the effect is similar and the links and chain will look exactly like a chain produced by the Fig. 3 form after the final forging operation, as the weld metal 22 is thereby spread evenly all over the surface of the links in the same manner in both cases. Also, there may be a stud 12 in Fig. 5 which is similar to the stud in Figs. 2 and 3 and it is also welded and forged in like manner if it is present. The bevel formation of Figs. 2-4 may be used in the construction of Fig. 5 as at 43 or any other like form as desired may be employed.

The finished link 44 of Fig. 1 presents a smooth contour at the welded and forged side 46 which appears to be, and in strength is equal in all respects to the original unitary forged side 48. Dotted lines 50 represent the approximate extent of the weld metal 22 after the final forging step, but as finished, this metal is undetectable on the link and merges therewith to complete the same, and all stud links made according to the present invention will look like the link of Fig. 1 when finished, that is, all the links will appear to be, and in the final step are, forged in one continuous piece.

In Fig. 6, the blank 54 is shown as having two opposed arms 56, 58, similar to arms 14, 16, but formed with different ends comprising the projecting mating lugs 60, 62 and 64, 66 respectively, which are spaced in both horizontal and vertical directions on each arm to provide for a weld area. In this case there is no V-shaped conformation but due to the lugs, the weld will be of similar strength because the lugs each have two weld surfaces, as 68, 70. When arms 56, 58 are brought together, the lugs interfit in spaced relation and provide for an elongated weld in the form of a cross.

Fig. 10 shows a modified end construction wherein the pointed edges 72 are offset to form two connected V-shaped weld areas offset from each other, and Fig. 11 illustrates a further offset modification wherein the V-shaped welding areas 74 are formed along curved rather than straight beveled surfaces. Other modified ends may be made and used without departing from the scope of the invention.

In the process, blanks are forged in a die with the arms forming the open sides as described, solid links 18 are placed in the link openings and the arms are brought together. Then the welding, with its described deposition of surplus material takes place, the chain is placed in a final die with the weld and adjacent areas hot, and the welded areas are then forged by a hammer to the solid line showing of Fig. 1. By this means the chain may be manufactured in continuous lengths as desired with every link a solidly forged, strong and durable link, there being no inserted elements to break, and the metal of the links is all substantially uniform throughout. The final forging operation completes the link, refines the structure of the weld metal and adjacent link metal, and adds a strengthening operation by forging to the steel at the weld and that section near it, so that the present welds are extremely strong and durable and are stronger than the conventional weld. Also, the surplus metal 22 spreads out over the link arms and the stud if present, and provides a smooth surface and contour conforming to the shape of the final forging die.

Having thus described my invention and the advantages thereof, I do not wish to be limited to the details herein disclosed, otherwise than as set forth in the claims, but what I claim is:

1. The method of making chain comprising the steps of forming a link blank having an open part to admit another link, closing the open part and welding, forming a surplus of metal at the weld, and simultaneously shaping the link and forging the weld area while hot in a die shaped to final link form desired, the forging step spreading the surplus metal over the link adjacent weld to form a smooth surfaced link.

2. The method of making a chain link comprising the steps of forming a link blank, said blank having free ends spaced sufficiently to admit another link or links, forcing the free ends together, welding the free ends of the blank by deposition of metal in fluid condition, and simultaneously shaping the link and forging the ends and the metal while hot in a die to refine and strengthen the weld metal and adjacent parent link metal.

3. The method of forging a chain link comprising the steps of forming a blank having spaced ends, bringing said ends substantially together, applying a surplus of welding metal, welding said ends together into a complete link, placing the link while hot in a die, and refining the weld metal and ends in a forging hammer.

4. The method of making a chain link comprising the steps of forming a link blank having a pair of opposed, spaced ends, bringing said ends into juxtaposition, applying more fluid welding material to said ends than is needed to weld them, welding the ends thereby, and forming and forging the weld and adjacent areas while hot in a die shaped to the final form of the link to spread the surplus welding material over certain areas of the link to form a completely forged and shaped link.

5. The method of forging a chain link comprising the steps of forming a link blank having a pair of spaced, opposed ends, bringing said ends into juxtaposition, welding said ends by melting a surplus of welding metal at said ends, and hot forging the weld, extra welding metal, and ends together in a die conforming to a finished link to form a link shaped to desired dimensions.

6. A method of making a forged-link chain comprising the steps of forming at least two solid links and a link having spaced ends forming an interrupted link, placing the solid links in the interrupted link, bringing the ends together, applying a surplus of welding metal in fluid condition to said ends to weld the same together and leaving extra metal extending slightly from the weld at the sides of the link ends, placing the links in a die, and simultaneously forging and refining the weld, extra metal, and link ends by means of a hammer, into a shape corresponding to the die, to form a smooth surfaced, uniform link side at said ends.

7. Method of making chain including the steps of forming a pair of solid closed links and an open split link having ends defining the split, placing a solid link over each end, bringing the ends toward each other to close the split link, depositing a surplus of molten metal at the split to weld the ends together and leaving weld metal at a side of the link in the area of the split, forging the welded area while hot in dies conforming to the shape of a finished link, and thereby additionally welding the ends together, and shaping the link to final form as defined by the dies.

8. Method of making chain including the steps of forming a pair of solid closed links and an open split stud link having ends defining the split and the stud, placing a solid link over each end, bringing the ends toward each other and adjacent the stud, depositing a surplus of molten metal at the ends and stud to weld the ends and stud together into a unitary mass with excess metal at a side of the link at the weld area, forging the weld area while hot including the welded area of the stud in a die conforming to the shape of a finished link, and thereby reducing the extent of the surplus metal, and shaping the link and its stud to final form as defined by the die.

9. The method of making chain comprising the steps of forming a blank having a solid side and a side having spaced ends defining a split side, inserting at least one solid link in the blank through the ends forming the split, bringing the spaced ends into close juxtaposition, applying a molten welding metal to the ends and welding the same, and finally placing the welded blank in a die and forging the welded area to the desired shape according to the die.

10. The method of claim 8 including the additional steps of initially forming a stud on the solid side and welding the stud to the said ends as a part of the welding step.

HENRY ST. PIERRE.